No. 640,164. Patented Dec. 26, 1899.
A. F. BARDWELL.
REGISTERING MACHINE.
(Application filed Feb. 27, 1899.)
(No Model.) 8 Sheets—Sheet 1.
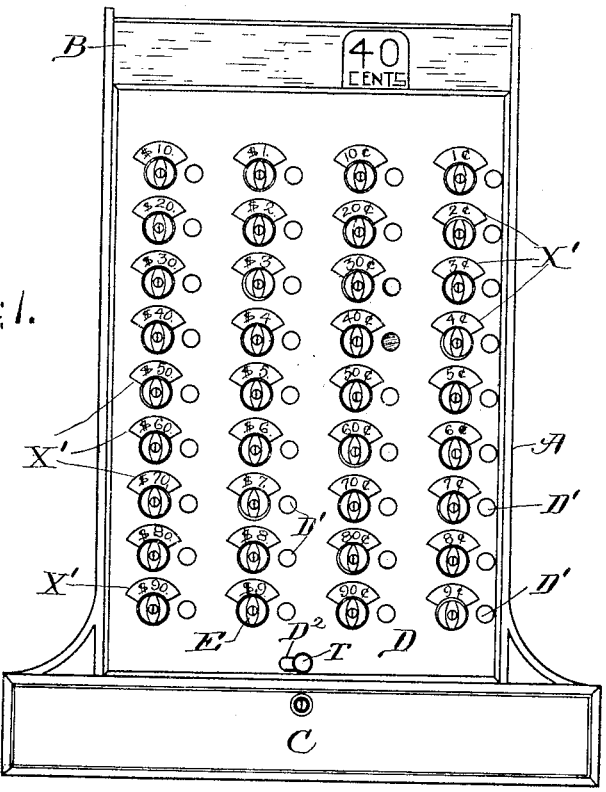
Fig. 1.
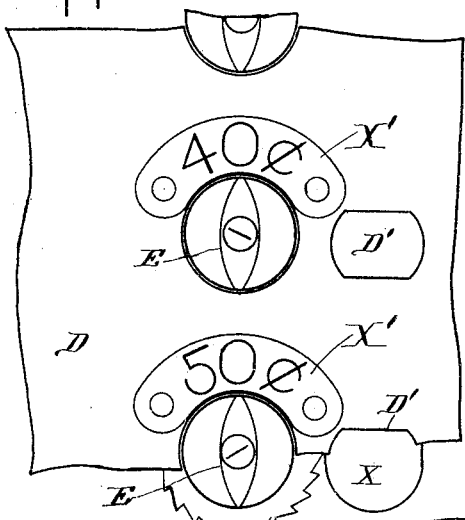
Fig. 24.
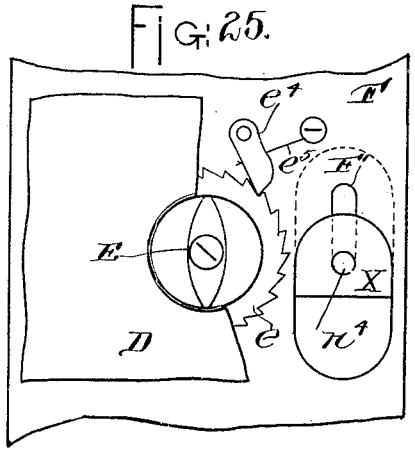
Fig. 25.
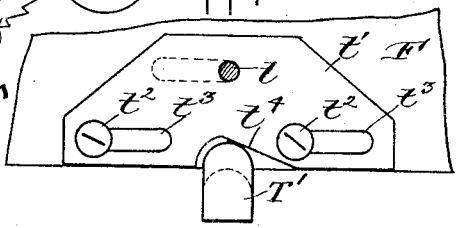
Fig. 17.
WITNESSES:
James Hamilton
E. A. Allen.
INVENTOR
Arthur Francis Bardwell
BY 
ATTORNEY.
THE NORRIS PETERS CO., PHOTO-LITHO., WASHINGTON, D. C.

No. 640,164. Patented Dec. 26, 1899.
A. F. BARDWELL.
REGISTERING MACHINE.
(Application filed Feb. 27, 1899.)
(No Model.) 8 Sheets—Sheet 2.
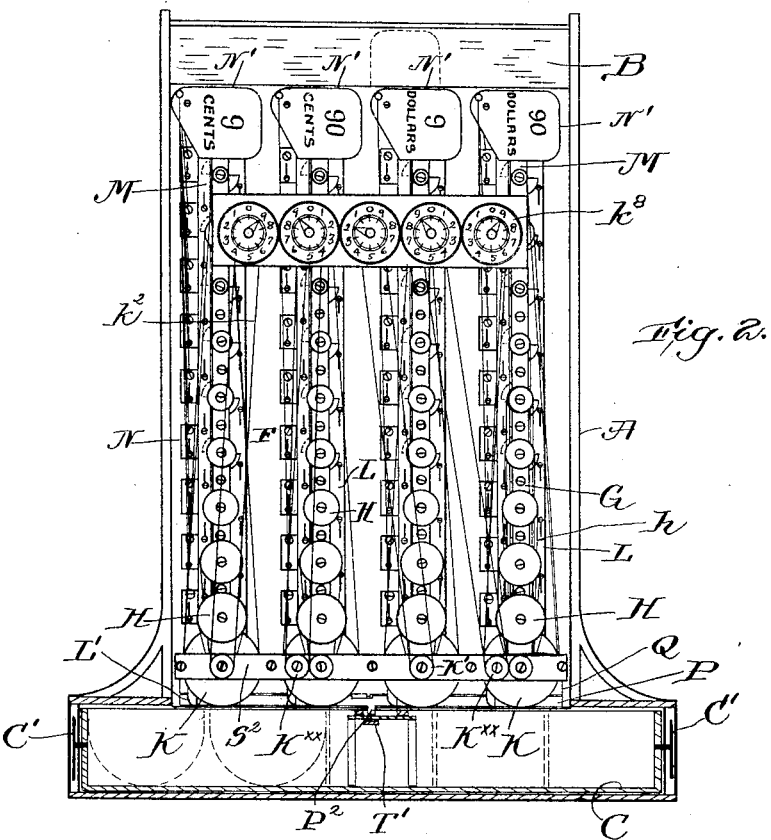
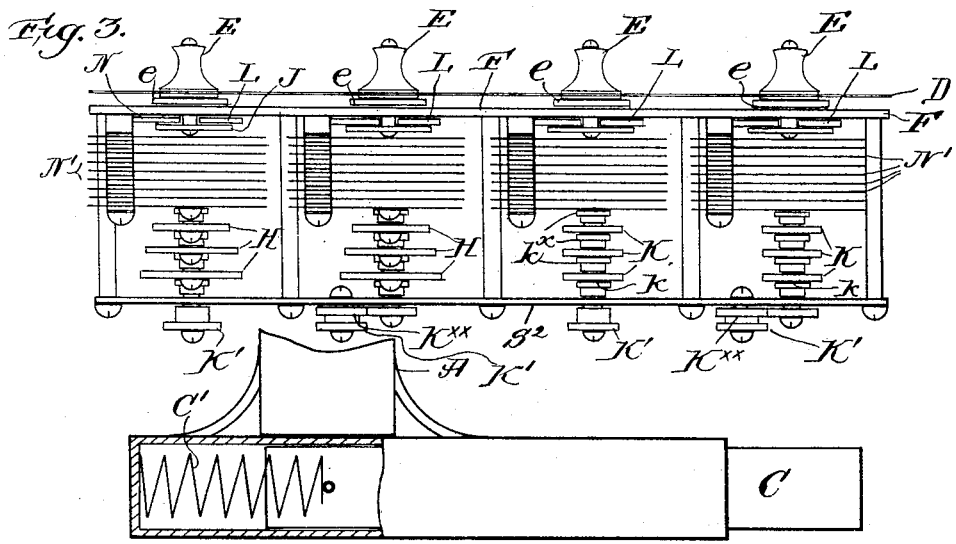
WITNESSES: INVENTOR
James H Hamilton Arthur Francis Bardwell
E. A. Allen. BY Edward S. Beach
ATTORNEY.

No. 640,164. Patented Dec. 26, 1899.
A. F. BARDWELL.
REGISTERING MACHINE.
(Application filed Feb. 27, 1899.)
(No Model.) 8 Sheets—Sheet 3.

WITNESSES:
James Hamilton
E. A. Allen.

INVENTOR
Arthur Francis Bardwell
BY
Edward S. Beach
ATTORNEY.

No. 640,164. Patented Dec. 26, 1899.
A. F. BARDWELL.
REGISTERING MACHINE.
(Application filed Feb. 27, 1899.)
(No Model.) 8 Sheets—Sheet 4.
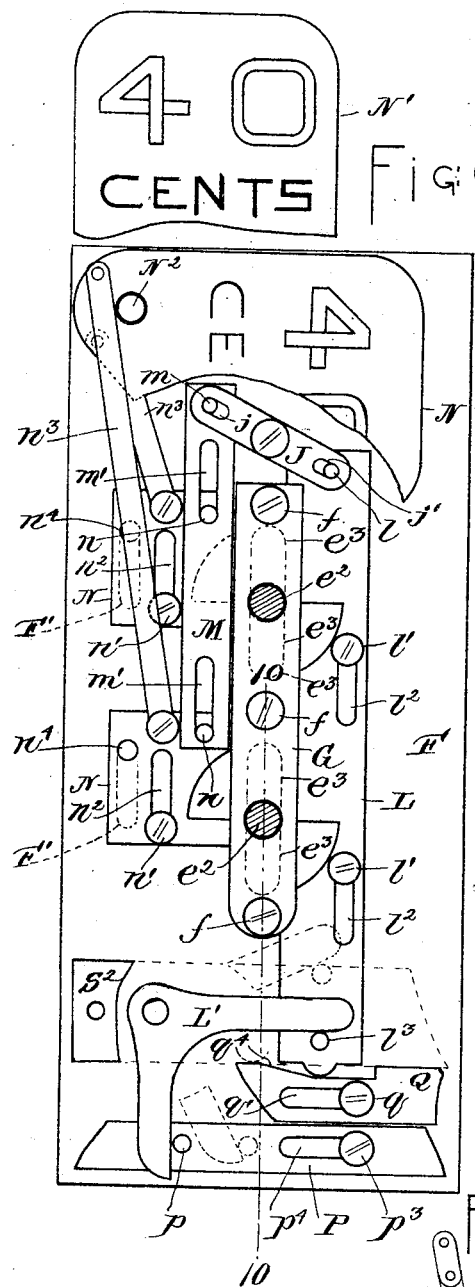
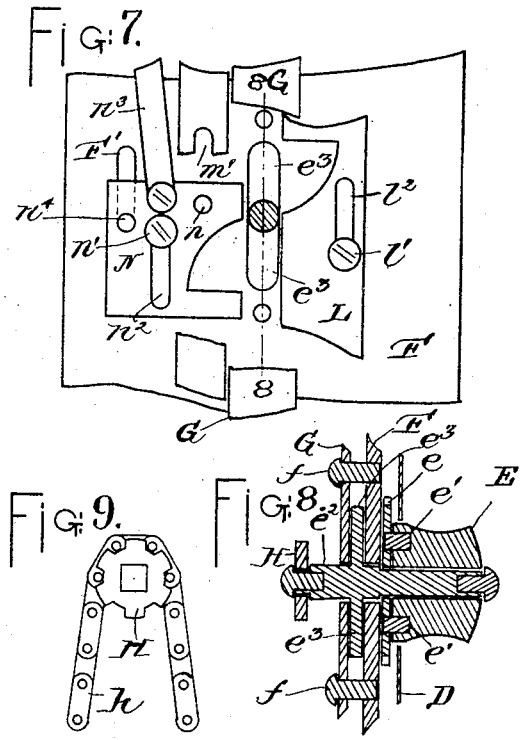
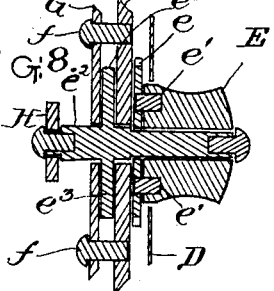
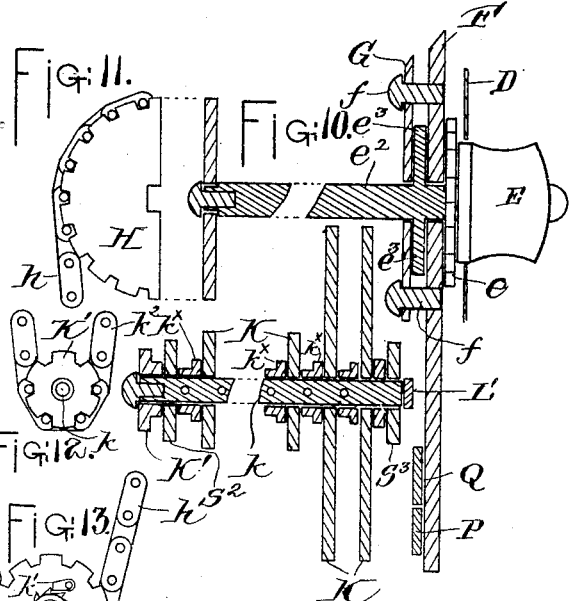
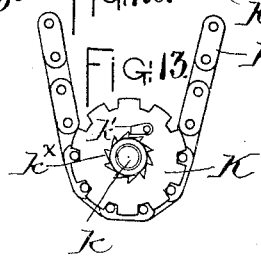
WITNESSES:
James Hamilton
E. A. Allen.
INVENTOR
Arthur Francis Bardwell
BY
Edward S. Beach
ATTORNEY.

No. 640,164. Patented Dec. 26, 1899.
A. F. BARDWELL.
REGISTERING MACHINE.
(Application filed Feb. 27, 1899.)
(No Model.) 8 Sheets—Sheet 5.
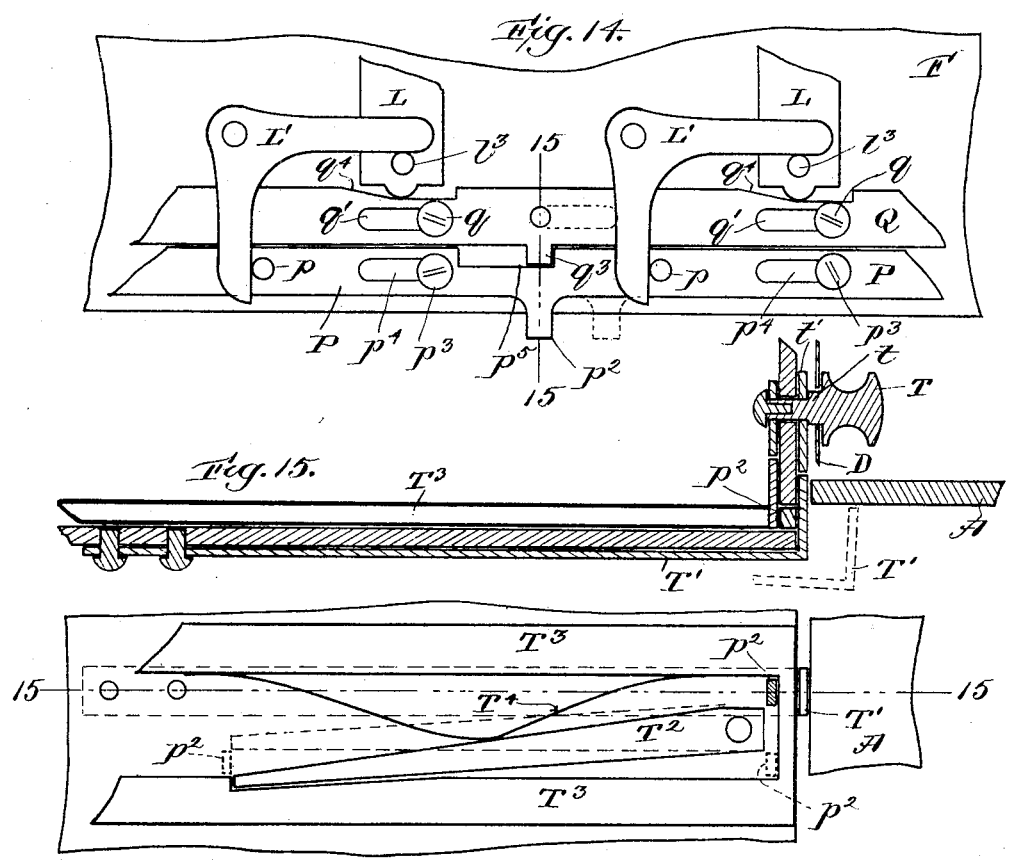
WITNESSES:
James Hamilton
E. A. Allen.
INVENTOR
Arthur Francis Bardwell
BY Edward S. Beach
ATTORNEY.

No. 640,164.
A. F. BARDWELL.
REGISTERING MACHINE.
(Application filed Feb. 27, 1899.)
Patented Dec. 26, 1899.
(No Model.)
8 Sheets—Sheet 5.
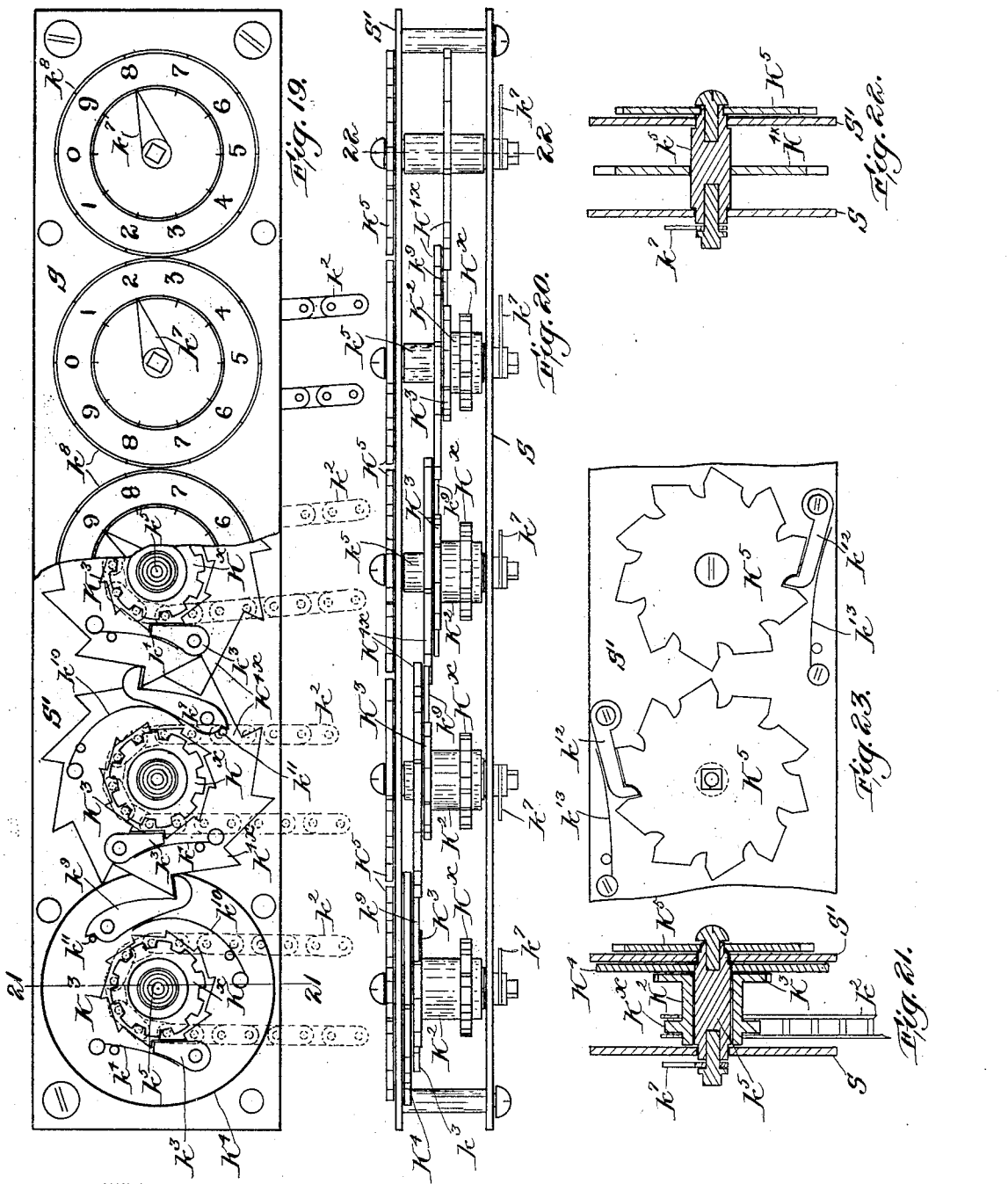
WITNESSES:
James Hamilton
E. A. Allen.
INVENTOR
Arthur Francis Bardwell
BY Edward S. Beach
ATTORNEY.

No. 640,164. Patented Dec. 26, 1899.
A. F. BARDWELL.
REGISTERING MACHINE.
(Application filed Feb. 27, 1899.)
(No Model.) 8 Sheets—Sheet 7.

Witnesses: E. A. Allen, John W. Saxe.

Inventor: Arthur Francis Bardwell, by Edward S. Beach, Attorney.

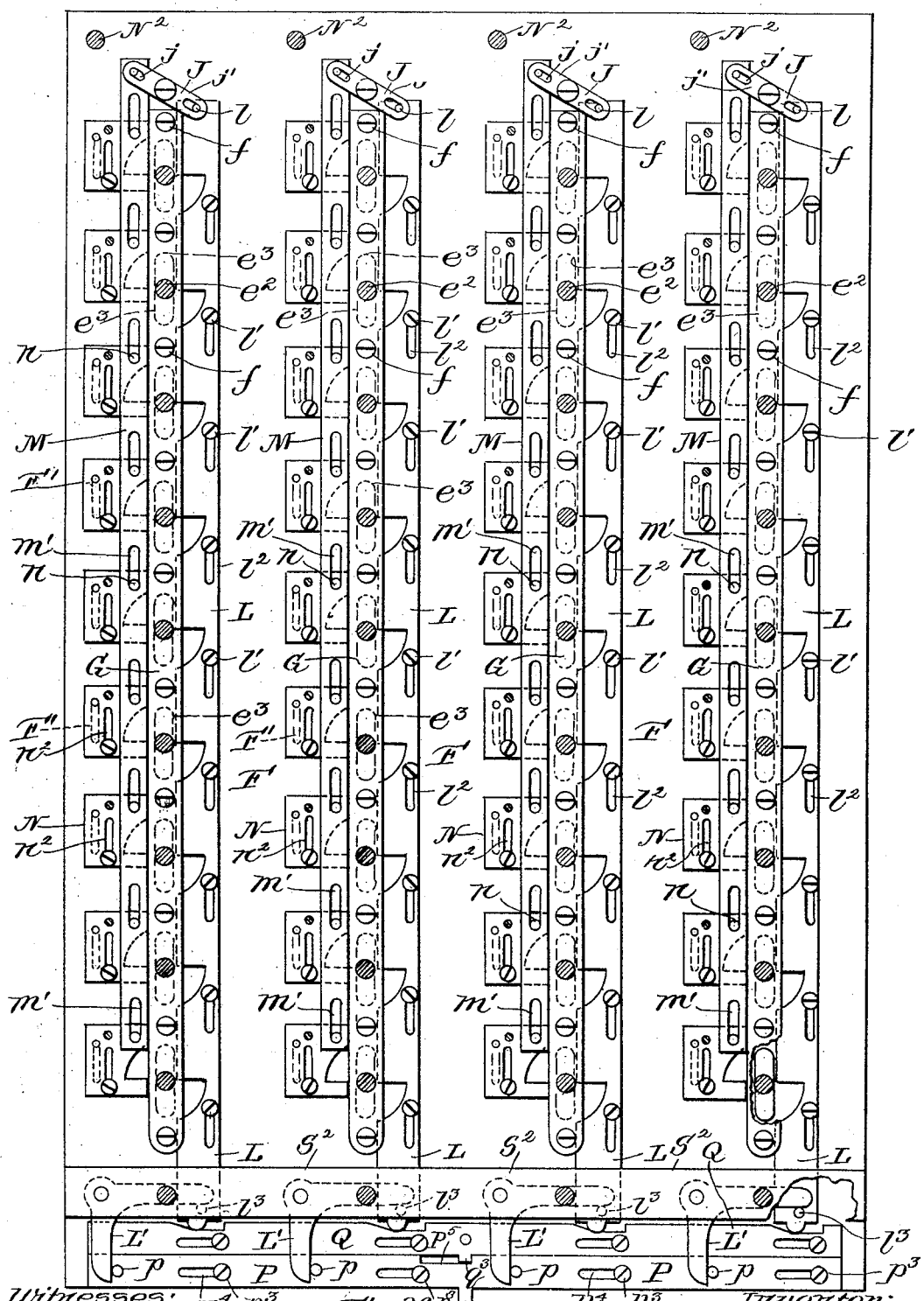

UNITED STATES PATENT OFFICE.

ARTHUR FRANCIS BARDWELL, OF SPRINGFIELD, MASSACHUSETTS, ASSIGNOR TO THE BARDWELL VOTOMETER COMPANY, OF BOSTON, MASSACHUSETTS.

REGISTERING-MACHINE.

SPECIFICATION forming part of Letters Patent No. 640,164, dated December 26, 1899.

Application filed February 27, 1899. Serial No. 706,910. (No model.)

*To all whom it may concern:*

Be it known that I, ARTHUR FRANCIS BARDWELL, a citizen of the United States, residing at Springfield, in the county of Hampden and State of Massachusetts, have invented certain new and useful Improvements in Registering-Machines, of which the following is a specification, reference being had therein to the accompanying drawings.

Figures 4, 5:
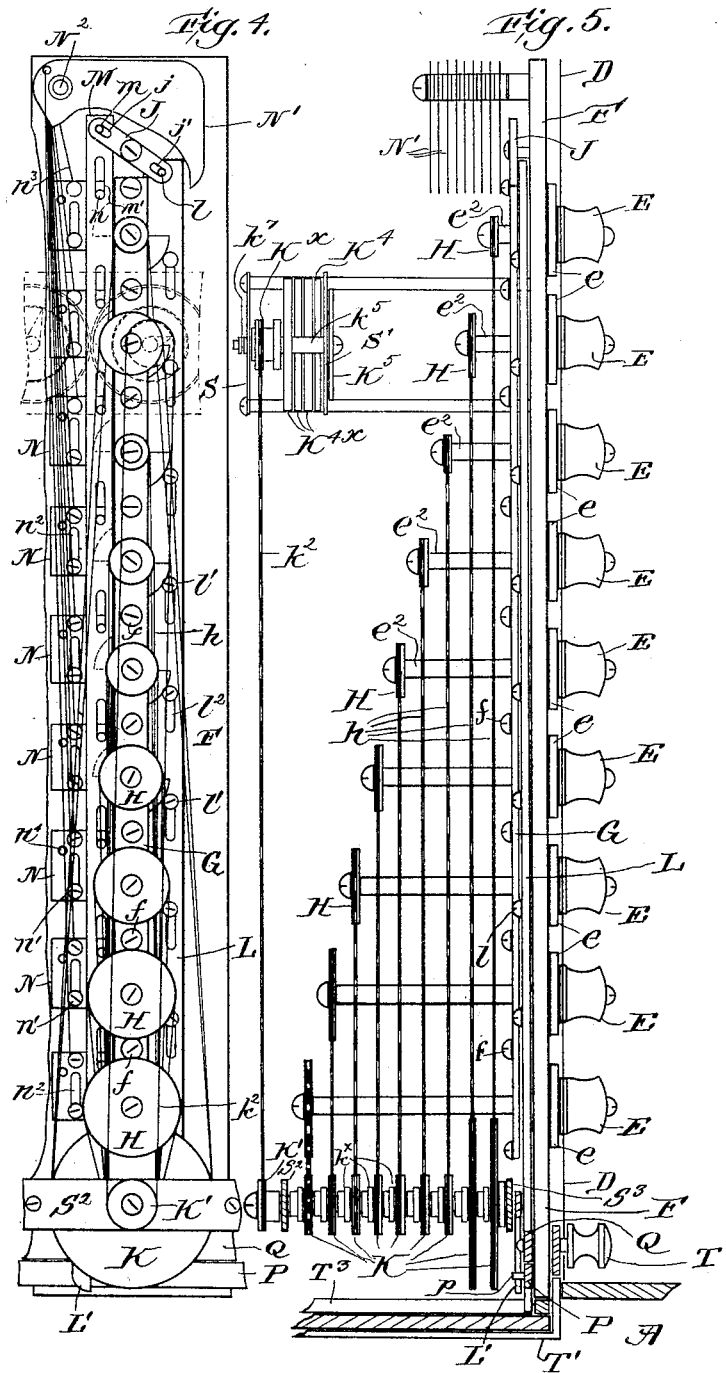
Figure 25:
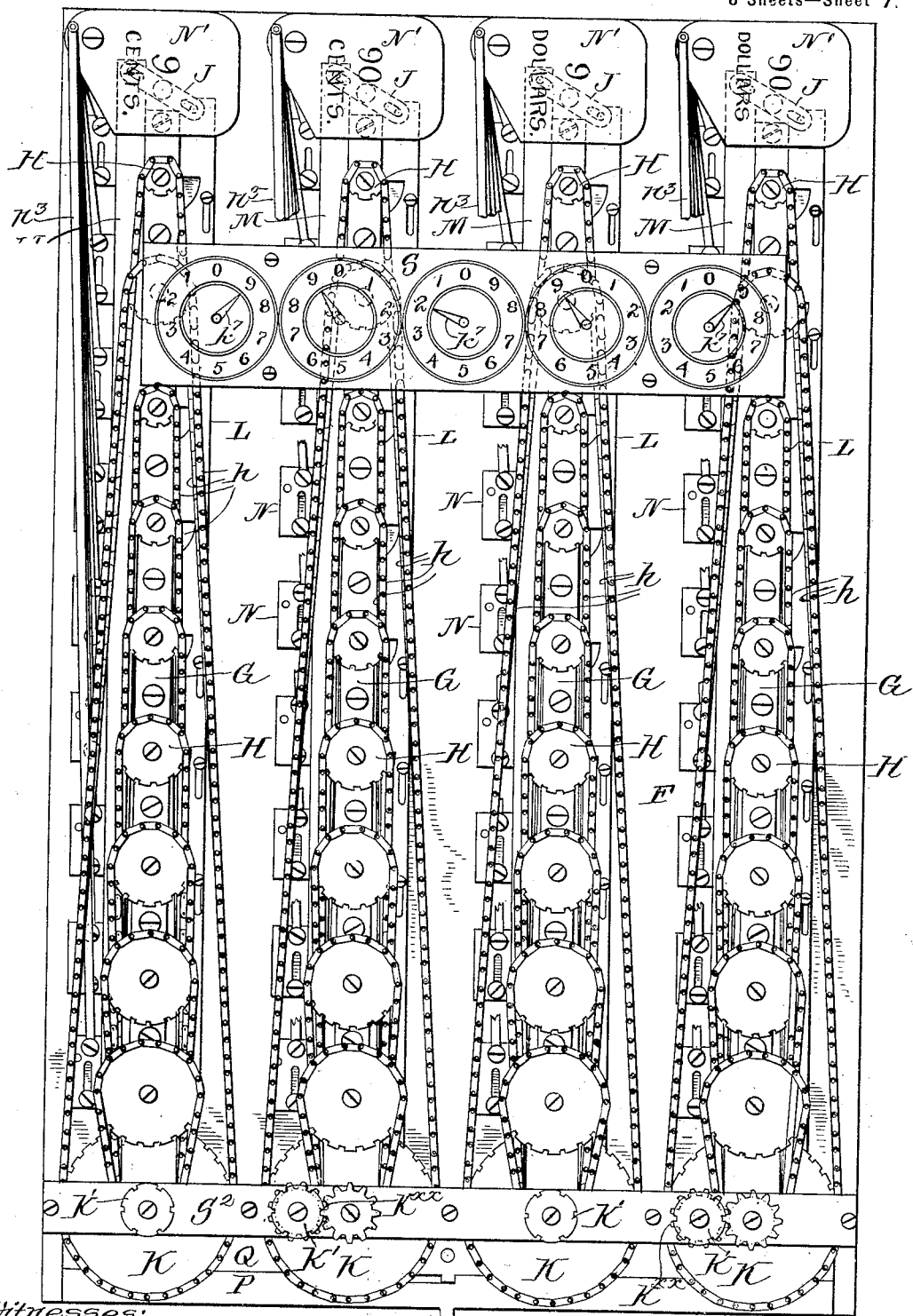

Figure 1 is a front elevation of my new registering-machine. Fig. 2 is a rear elevation of my new registering-machine, the rear casing being shown removed and the cash-drawer and its mechanism shown in transverse vertical section. Fig. 3 is a top plan view, some of the parts being removed for clearness. Fig. 4 is a rear elevation of a column of my new registering-machine. Fig. 5 is a side elevation of what is shown in Fig. 4, part of the casing and cash-drawer mechanism being added in sectional view. Fig. 6 shows the locking and indicating mechanism, the locking mechanism being shown in its unlocked position. Fig. 7 is a detail which shows the locking mechanism in its locking position. Fig. 8 is a section on line 8 8 of Fig. 7. Fig. 9 is an end view of the sprocket wheel and chain shown in section in Fig. 8. Fig. 10 is a section on line 10 10 of Fig. 6. Fig. 11 is an end view of the sprocket wheel and chain as shown in section in Fig. 10. Figs. 12 and 13 are details hereinafter referred to and described. Fig. 14 is a detail in elevation of the resetting and interlocking slides. Fig. 15 is a section on line 15 15 of Fig. 14 and of Fig. 16. Fig. 16 is a plan view of the resetting mechanism. Fig. 17 is a detail in elevation of the cash-drawer-releasing mechanism. Fig. 18 is a detail showing the spring which forces out the cash-drawer when unlocked. Fig. 19 shows the totalizers in elevation, parts being broken away to show the mechanism. Fig. 20 is a plan view of what is shown in Fig. 19. Fig. 21 is a section on line 21 21 of Fig. 19. Fig. 22 is a section on line 22 22 of Fig. 20. Fig. 23 is a detail showing the locking-wheel of the totalizers. Fig. 24 is a detail of the front of the register, and Fig. 25 is a detail showing one means of indicating which register thumb-piece has been turned. Fig. 25$^a$ is an elevation showing, on an enlarged scale, most of the parts illustrated in Fig. 2. Fig. 26 is an elevation showing, on an enlarged scale, the locking mechanism illustrated in Fig. 2.

My invention relates to registering-machines in which the register or totalizer is actuated by the operator's turning a shaft, in contradistinction from those in which the actuation of the register is caused by the operator's pushing or pulling a sliding member.

The object of my invention is to produce a registering-machine which is simple in construction, easy of repair, cheap in manufacture, and of few parts, and in which the parts are all in positive mechanical connection, thereby avoiding all danger of mistake or of cheating.

One feature of my invention is the locking-slide, which locks all the shafts in one column by the turning of one of the shafts in that column.

Another feature of my invention is the means provided for locking all the shafts in the machine when it is desired to release the cash-drawer.

A third feature is the novel means disclosed for indicating which shaft has been turned.

A fourth feature is the novel mechanism used to move the indicator-cards up and down.

A further feature is the means shown to reset the locking-slide to its original position, and another feature is the means shown for locking and releasing the cash-drawer.

My invention consists in the registering-machine, the totalizer, and the combinations herein described and claimed.

In the drawings illustrating the principle of my invention and the best mode now known to me of applying that principle, A is the casing, which supports a glass case B at its upper portion and incloses a drawer C at its lower portion. A thin metal face-plate D is detachably secured to the casing in the front of the machine. The thumb-piece E is secured by means of the pins $e'$ to the ratchet-wheel $e$, which is fast upon the shaft $e^2$. The shaft $e^2$ is journaled in the back plate F and the rib G, the rib G and back plate F being secured together by the screws $f$. Projecting from the shaft $e^2$ are the ears $e^3$, which engage notches in the locking-slide L and in the slidable plates N. Fast upon the inner end of the shaft $e^2$ is the sprocket-wheel H, over which passes the sprocket-chain $h$. The sprocket-chain $h$ at its lower portion passes over a sprocket-wheel K, which is loose upon the shaft $k$. Pivoted on each of the sprocket-wheels K is a pawl $k'$, which engages the teeth of a ratchet-wheel $k^\times$, fast upon shaft $k$, Fig. 13. A sprocket-wheel K' is fast upon the inner end of the shaft $k$ and engages the sprocket-chain $k^2$, which passes over the sprocket-wheel $K^\times$ of the adding mechanism of that column, Fig. 19. The sprocket-wheel $K^\times$ is integral with the collar $K^2$, as is also the ratchet-wheel $K^3$. The collar $K^2$ is free to rotate upon the shaft $k^5$. Fast to the shaft $k^5$ is the counting-disk $K^4$, upon which is pivoted a pawl $k^3$. The pawl $k^3$ is kept in engagement with the ratchet $K^3$ by means of the spring $k^4$. The counting-disk $K^4$ of the units-column is smooth-edged; but the counting-disks $K^{4\times}$ of the other adding mechanisms are notched, as shown. Pivoted on the disks $K^4$ $K^{4\times}$ is a pawl $k^9$, which is kept in engagement with the teeth of the wheel $K^{4\times}$ by means of a spring $k^{10}$. A pin $k^{11}$ limits the movement of the pawl $k^9$.

A toothed locking-wheel $K^5$ is fast upon the shaft $k^5$, and a pawl $k^{12}$ is kept in engagement with the teeth of the locking-wheel $K^5$ by means of the spring $k^{13}$. The shaft $k^5$ is journaled in the plates S S', and the plate S bears suitable dials $k^8$. Fast upon the shaft $k^5$ is a suitable pointer $k^7$. The shaft $k^5$ of the last of the adding mechanisms which make up the totalizer of my registering-machine bears only the pointer $k^7$, the counting-disk $K^{4\times}$, and the toothed locking-wheel $K^5$.

The locking-slide L is secured to the back plate F by means of screws $l'$, which pass through the slots $l^2$ in the locking-slide L. A stud $l$ projects from the locking-slide L into a slot $j'$ in one end of the lever J. A stud $m$ projects from the upper portion of the resetting-strip M into a slot $j$ in the other end of the lever J. The resetting-strip M is slotted at $m'$ to receive studs $n$, which project from the notched slidable plates N. The notched slidable plates N are secured to the back plate F by means of the screws $n'$, which pass through slots $n^2$ in the notched plates N. To each of the notched slidable plates N is secured one end of a link $n^3$, the other end of the link $n^3$ being secured to an indicator-card N', which is pivoted on a shaft $N^2$. Projecting from each of the notched slidable plates N and through slots F' in the back plate F are studs $n^4$, the other ends of which are fast to a slidable plate X. One half of the plate X is of one color and the other half of a different color. The movement of the slidable plate X is equal to one half its length. A window D' in the face-plate D allows one half of the plate X to be seen at a time. Projecting from the lower end of the locking-slide L is a stud $l^3$, which contacts with one arm of the bell-crank lever L', the other end of the bell-crank lever L' contacting with a stud $p$ on the resetting-slide P. The resetting-slide P is secured to the back plate F by means of screws $p^3$, which pass through slots $p^4$ in the resetting-slide P.

A lug $p^2$ projects from the lower side of the resetting-slide P, and an open slot $p^5$ is formed in the resetting-slide P opposite the lug $p^2$. Secured to the back plate F by means of screws $q$, which pass through slot $q'$, is the elevating-slide Q, which lies parallel with and just above the resetting-slide P. A lug $q^3$ projects from the lower side of the elevating-slide Q into the open slot $p^5$ in the resetting-slide P. The elevating-slide Q is formed on its upper side with inclined surfaces $q^4$, which are adjacent to the lower ends of the locking-slides L. Through a slot $D^2$ in a face-plate D passes the shank $t$ of the knob T, to which is secured a slidable plate $t'$, having an inclined surface $t^4$. Screws $t^2$ pass through slots $t^3$ in the plate $t'$ to secure it to the back plate F. To the upper rear portion of the cash-drawer C is secured a flat spring T', which is bent at right angles to itself at its outer extremity, and the end of this bent portion bears against the inclined surface $t^4$ of the plate $t'$. Secured to the upper rear portion of the cash-drawer C are the guides $T^3 T^3$, and pivoted in the upper rear portion of the cash-drawer C, between the guides $T^3 T^3$, is the tongue $T^2$, which is wedge-shaped, as shown. A spring $T^4$ is interposed between one of the grooves $T^3$ in the inclined side of the tongue $T^2$.

Fig. 12 shows in detail the sprocket-wheel K' and sprocket-chain $k^2$, and Fig. 13 shows in detail one of the sprocket-wheels K, with its sprocket-chain $h$. The ratio of the number of teeth in the sprocket-wheel H to the number of teeth in the sprocket-wheel K is such that by a half-turn (a turn through one hundred and eighty degrees) the shaft $k$ is turned through the proper portion of a rotation. Therefore the sprocket-wheel H, which is fast on the shaft $e^2$ in the units place in any one of the columns, has one-tenth the number of teeth of its mate—the sprocket-wheel K on the shaft $k$—the sprocket-wheel H, which is on the shaft $e^2$ in the five-units place in any one column, has the same number of teeth of its mate—sprocket-wheel K—and so on. The shaft $k$ is journaled in the plates $S^2 S^3$. Secured to the face-plate D over each of the thumb-pieces E is a plate X', which designates the amount that the turning of that thumb-piece registers.

The operation of my registering-machine is as follows: The operator turns through one hundred and eighty degrees the thumb-piece assigned to the amount which he wishes to register. He thereby causes the ears $e^3$ of the shaft $e^2$ to engage the adjacent notch in the locking-slide L and the adjacent notch in the slidable plate N. The locking-slide L is raised and the slidable notched plate N which adjoins that shaft $e^2$ is lowered and draws down the link $n^3$, thereby raising into sight the indicator-card N'. The resetting-strip M moves down. The raising of the locking-slide L causes the resetting-slide P to be moved longitudinally, and the projection $p^2$ passes from one side of the tongue $T^2$ to the opposite side thereof. Having registered the total amount, the operator pushes the knob T from one end of the slot $D^2$ to the other end thereof, and thereby forces down the spring T' through the medium of the inclined surface $t^4$ on the plate $t'$, which is fast to the shank of the knob T. The bent portion of the flat spring T' being thus forced below the edge of the casing A releases the cash-drawer C, and the spring C' forces the cash-drawer out. As the cash-drawer moves outward the straight side of the tongue $T^2$ is pressed against the projection $p^2$ of the resetting-slide T, and when the inner end of the tongue $T^2$ has moved past the lug $p^2$ the tongue T is forced back into place by the spring $T^4$, thus leaving the lug $p^2$ on the inclined side of the tongue $T^2$. (See Fig. 16.) On closing the cash-drawer C the inclined side of the tongue $T^2$ presses against the lug $p^2$, which passes between the tongue $T^2$ and the spring $T^4$. Thus by closing the drawer the resetting-slide P is moved to its original position, and by means of the bell-crank levers L' draws down the locking-slides L to their original positions. The resetting-strips M are moved upward and carry with them those of the slidable notched plates N which have been moved from their original positions. At the same time the indicator-cards N' are drawn down out of sight. The colored plate X is moved downward when the notched slidable plate N is moved downward, and the color exposed indicates to the observer that the particular thumb-piece adjacent thereto has been turned. When the slidable notched plate N is moved up or reset the color exposed by the plate X shows that the machine has been reset. The elevating-slide Q is fast to the shank $t$ of the knob T, and if it be desired to open the drawer C without registering any amount this may be done by moving the knob T from one side of the slot $D^2$ to the other side thereof. The elevating-slide Q is thereby moved longitudinally, and the inclined surfaces $q^4$ cause the locking-slides L of all the columns to be raised to their locking position. (Shown in Fig. 7.) At the same time the lug $q^3$ of the elevating-slide Q bears against the resetting-slide P and causes an equal longitudinal movement of the resetting-slide P. As before, the movement of the knob T causes the plate $t'$ to press down the spring T', thereby releasing the cash-drawer C. On closing the cash-drawer C the parts are reset, as before explained.

As will be readily understood, a half-turn of the thumb-piece A causes the proper amount of rotation of the shaft $k$, and through the sprocket-wheel K' and the sprocket-chain $k^2$ this rotation is communicated to the sprocket-wheel $K^\times$ and the toothed wheel $K^3$. The rotation of the toothed wheel $K^3$ is communicated to the counting-disk $K^4$ or $K^{4\times}$ through the pawl $k^3$. When the counting-disk $K^4$ or $K^{4\times}$ has moved through nine-tenths of a rotation, the pawl $k^9$ engages the teeth of the counting-disk $K^{4\times}$ of the adjacent and next higher column. The completion of the rotation of the counting-disk $K^4$ and $K^{4\times}$ will cause the counting-disk $K^{4\times}$ of the next higher column to be moved through one-tenth of a rotation. The counting-disks $K^4$ and $K^{4\times}$ rotate in a direction opposite from the counting-disks adjacent to them, and a proper reversal of the motion is made in every other column by means of the reversing-gears $K^{\times\times}$. As will be seen from Fig. 19, the pawl $k^9$ permits the independent rotation of the counting-disk $K^{4\times}$, with which it is in engagement, and the toothed locking-wheels $K^5$ prevent any forward motion of the counting-disks of the next lower column, due to friction between the counting-disk $K^{4\times}$ and the pawl $k^9$. Backward rotation of the thumb-piece E is prevented by the ratchet $e$ and pawl $e^4$, with which the ratchet-wheel $e$ is kept in engagement by the spring $e^5$.

The shaft $k^5$ is provided with a square end adapted to engage a resetting-key by means of which the pointers $k^7$ of each of the adding mechanisms may be brought to zero, and the totalizer of the machine is thus reset.

In the preferred form shown the thumb-pieces are arranged in columns, the first column being for units, the next for tens, the third for hundreds, and so on, and the upper thumb-piece registers the units of its particular column, the next lower two units, the third from the top three units, and so on, there being nine thumb-pieces in each column; but I desire it to be understood that I do not limit myself to this particular arrangement, as it is evident that the arrangement set forth may be departed from without departing from the principle of my invention.

What I claim is—

1. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotary motion of said wheels to said totalizer; means which prevent the backward rotation of said shafts; and means which reset the locking-slide.

2. In a registering-machine, the combination of a supporting-frame; a plurality of shafts provided with ears; a locking-slide common to all said shafts, and notched to engage the ears on said shafts; a wheel for, and fast upon, each of said shafts; means which connect said wheel with a wheel loose upon a main shaft; said main shaft; means which communicate the rotatory motion of said wheels to said main shaft; a totalizer connected to said main shaft; means which connect the said main shaft to said totalizer and thereby communicate the rotatory motion of said main shaft to said totalizer; means which prevent the backward rotation of said shafts; and means which reset the said locking-slide.

3. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; means which reset the said locking-slide; and means which indicate which shaft has been turned.

4. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; a plurality of slidable plates, one for each of said shafts and notched to engage the ears which project from said shafts; a plurality of indicator-plates which are connected, one to each of said slidable notched plates; means which reset the said locking-slide and the said slidable notched plates.

5. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; means which reset the locking-slide; and means which indicate the amount added upon the totalizer.

6. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; a plurality of slidable plates, one for each of said shafts, and notched to engage the ears which project from said shaft; an indicator-card for each slidable notched plate, said indicator-cards being pivoted on a shaft; the shaft upon which the indicator-cards are pivoted; a link, one end of which is secured to one of said slidable notched plates, and the other end of which is secured to one of said indicator-cards; and means which reset said locking-slide and said slidable notched plates.

7. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; a drawer; a wedge-shaped lever pivoted on said drawer; a spring which controls said lever; locking means for said drawer; means which unlock said drawer; a bell-crank lever; and a resetting-slide which is actuated by the closing of said drawer.

8. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; a drawer; a wedge-shaped lever pivoted on said drawer; a spring which controls said lever; a spring which locks said drawer; a slidable plate formed with an inclined surface which contacts with said locking-spring; a bell-crank lever; and a resetting-slide which is actuated by the closing of the drawer.

9. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shafts; a drawer; a wedge-shaped lever pivoted on said drawer; a spring which controls said lever; a spring which locks said drawer; means which automatically force out said drawer when said drawer is unlocked; a slidable plate formed with an inclined surface which contacts with said locking-spring; a bell-crank lever; and a resetting-slide which is actuated by the closing of the drawer.

10. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shaft; a drawer; locking means for said drawer; means which release said drawer-locking means and raise the locking-slide to its locking position; and means which restore said locking-slide to its original position.

11. In a registering-machine, the combination of a supporting-frame; a plurality of shafts provided with ears; a locking-slide common to all said shafts, and notched to engage the ears on said shafts; a wheel for, and fast upon, each of said shafts; a totalizer; means which communicate the rotatory motion of said wheels to said totalizer; means which prevent the backward rotation of said shaft; a drawer; a spring which locks said drawer; a slidable plate formed with an inclined surface which contacts with said locking-spring; an elevating-slide formed with inclined surfaces adjacent to the lower end of said locking-slide and provided with a lug which engages in an open slot in a resetting-slide; said resetting-slide; a bell-crank lever, one end of which contacts with a stud on said locking-slide and the other end of which contacts with a stud on said resetting-slide; said resetting-slide; a wedge-shaped lever which is pivoted on said drawer and which engages a lug projecting from said resetting-slide; and a spring which controls said wedge-shaped lever.

12. In a registering-machine, the combination of a supporting-frame; a plurality of shafts provided with ears and arranged in columns; a locking-slide for, and common to, all the shafts of one column and notched to engage the ears on said shafts; a wheel for, and fast upon, each of said shafts; a totalizer; means which communicate the rotatory motion of said wheels to said totalizer; means which prevent the backward rotation of said shafts; and means which reset said locking-slide.

13. A registering-machine comprising a supporting framework and casing; an apertured face-plate; a plurality of shafts provided with ears; a wheel for, and fast upon, each of said shafts; a locking-slide notched to engage the ears upon said shafts; means which prevent the backward rotation of said shafts; a totalizer; means which communicate the rotary motion of said shafts to said totalizer; and means which reset the locking-slide.

14. A registering-machine comprising a supporting framework and casing; an apertured face-plate; a plurality of shafts provided with ears; a wheel for, and fast upon, each of said shafts; a locking-slide notched to engage the ears upon said shafts; means which prevent the backward rotation of said shafts; a totalizer; means which communicate the rotatory motion of said shafts to said totalizer; means which indicate which shaft has been turned; and means which reset the indicating mechanism and the unlocking mechanism.

15. A registering-machine comprising a supporting framework and casing; an apertured face-plate; a plurality of shafts provided with ears; a wheel for, and fast upon, each of said shafts; a locking-slide notched to engage the ears upon said shafts; means which prevent the backward rotation of said shafts; a totalizer; means which communicate the rotatory motion of said shafts to said totalizer; means which indicate the sum which has been added upon said totalizer; and means which reset the indicating mechanism and the unlocking mechanism.

16. A registering-machine comprising a supporting framework and casing; an apertured face-plate; a plurality of shafts provided with ears; a wheel for, and fast upon, each of said shafts; a locking-slide notched to engage the ears upon said shafts; means which prevent the backward rotation of said shafts; a totalizer; means which communicate the rotatory motion of said shafts to said totalizer; a drawer inclosed in said casing; means which lock said drawer; means which release said locking means and move said locking-slide to its locking position; and means which reset said locking-slide to its unlocking position.

17. A registering-machine comprising a supporting framework and casing; an apertured face-plate; a plurality of shafts arranged in columns and provided with ears; a wheel for, and fast upon, each of said shafts; a locking-slide for each column and notched to engage the ears upon the shafts of its said column; means which prevent the backward rotation of said shafts; a totalizer; means which communicate the rotatory motion of said shafts to said totalizer; and means which reset said locking-slides.

18. A registering-machine comprising a supporting framework and casing; an apertured face-plate; a plurality of shafts provided with ears, and arranged in columns; a wheel for, and fast upon, each of said shafts; a locking-slide for each column and notched to engage the ears upon the shafts of its said column; means which prevent the backward rotation of said shafts; a totalizer; means which communicate rotatory motion of said shafts to said totalizer; a drawer inclosed in said casing; means which lock said drawer; means which release said locking means and move said locking-slides to their locking positions; and means which reset said locking-slides to their unlocking positions.

In testimony whereof I affix my signature in presence of two witnesses.

ARTHUR FRANCIS BARDWELL.

Witnesses:
   EDWARD S. BEACH,
   E. A. ALLEN.